United States Patent [19]
Kennedy

[11] 3,916,294
[45] Oct. 28, 1975

[54] CABLE TELEVISION SUBSTATION REGULATED POWER SUPPLY WITH RIPPLE SUPPRESSION

[75] Inventor: Kenneth E. Kennedy, Syracuse, N.Y.

[73] Assignee: The Magnavox Company, Fort Wayne, Ind.

[22] Filed: Mar. 21, 1974

[21] Appl. No.: 453,221

[52] U.S. Cl. ................ 323/22 T; 307/93; 307/297; 317/31; 317/33 VR; 323/39
[51] Int. Cl.² .......................................... G05F 1/56
[58] Field of Search ........... 323/9, 19, 22 T, 39, 41; 307/92, 93, 105, 297; 317/31, 33 VR, 50

[56] References Cited
UNITED STATES PATENTS

| | | | |
|---|---|---|---|
| 2,967,991 | 10/1961 | Deuitch | 323/22 Z |
| 2,984,779 | 5/1961 | Klees | 323/22 T |
| 3,327,201 | 6/1967 | Brantley, Jr. | 317/33 VR |
| 3,437,905 | 4/1969 | Healey et al. | 323/9 X |

FOREIGN PATENTS OR APPLICATIONS

| | | | |
|---|---|---|---|
| 1,092,863 | 11/1967 | United Kingdom | 323/22 T |

OTHER PUBLICATIONS

G.E. Transistor Manual, 7th Edition, 1964, pp. 227, 228 relied upon.

*Primary Examiner*—Gerald Goldberg
*Attorney, Agent, or Firm*—Thomas A. Briody; William J. Streeter; Joe E. Barbee

[57] ABSTRACT

A voltage regulating circuit in which the suppression of the ripple component of the output voltage is maintained at input voltage levels insufficient to support the regulation of the steady output voltage component. The ripple suppression is achieved at low input voltage levels without additional active devices. Through incorporation of a resistor in a circuit location not normally including a resistor, and by appropriate selection of component values, the ripple suppression at low input voltage levels is achieved without appreciable deterioration of the output voltage regulation under normal operating conditions.

9 Claims, 1 Drawing Figure

CABLE TELEVISION SUBSTATION REGULATED POWER SUPPLY WITH RIPPLE SUPPRESSION

BACKGROUND OF THE INVENTION

1. Field of the Invention

This invention relates generally to voltage regulating circuits and more particularly to the class of regulating circuits used in circumstances where output voltage ripple suppression is important and where the input voltage can fall below normal operating levels. These circumstances are present, for example, in a cable television system substation.

2. Description of the Prior Art

It is known in the prior art to provide for ripple suppression by providing a feedback path to correct for transients occurring in an output voltage of the regulating circuits. However, the feedback path typically is operative only when the input voltage to the power supply is in the normal operating range. Furthermore, the ripple suppression feedback path is typically coincident with the normal voltage regulating feedback path.

It is also known in the prior art to provide voltage regulating circuits with separate feedback paths to provide output ripple voltage suppression at input voltage levels insufficient for normal operation of the regulating circuit. Such a feedback path can be provided by a capacitance multiplier circuit to provide the power supply with an active filter. However, the need for additional active devices provides increased expense to the power supply.

In addition, previous designs provide increasing power losses at higher output current and therefore the efficiency can be compromised by the ripple suppression apparatus.

It is therefore an object of the present invention to provide an improved voltage regulating circuit.

It is a further object of the present invention to provide a voltage regulating circuit with an improved output voltage ripple suppression characteristics.

It is still a further object of the present invention to provide a voltage regulating circuit with an improved output voltage ripple suppression network which does not employ active circuits.

It is yet another object of the present invention to provide a voltage regulating circuit with an output voltage ripple suppression network, the ripple suppression network continuing to be functional when the input voltage levels are below the operating level for the regulating circuits.

It is a more particular object of the present invention to provide a voltage regulating circuit with an output voltage ripple suppression network, the suppression network not employing active devices and functioning below normal operating levels for the regulating circuits.

SUMMARY OF THE INVENTION

The aforementioned and other objects are accomplished, according to the present invention, by the addition of a resistor in a voltage regulating circuit. Proper selection of the resistor and other component values can suppress output voltage ripple signal at input voltage levels below normal operation of the voltage regulating circuit with only a modest decrease in output voltage regulation.

The resistor and a capacitor are arranged to maintain sufficient gain in a portion of the feedback amplifier of the output voltage regulation circuit to suppress ripple components in the output voltage at low input voltage levels by providing a reference voltage to be compared against a voltage related to the output voltage. At input voltage levels permitting normal operation of the voltage regulating circuits, the voltage across a Zener diode is utilized to provide a stable reference voltage. The resistor and capacitor suppress transient changes in the output voltage, but do not suppress drift of the d.c. component of the output voltage.

These and other features will be understood upon reading of the following description along with the drawing.

BRIEF DESCRIPTION OF THE DRAWING

The FIGURE is a schematic circuit diagram of the power supply of the instant invention.

DESCRIPTION OF THE PREFERRED EMBODIMENT

Detailed Description of the FIGURE

Figure 1:
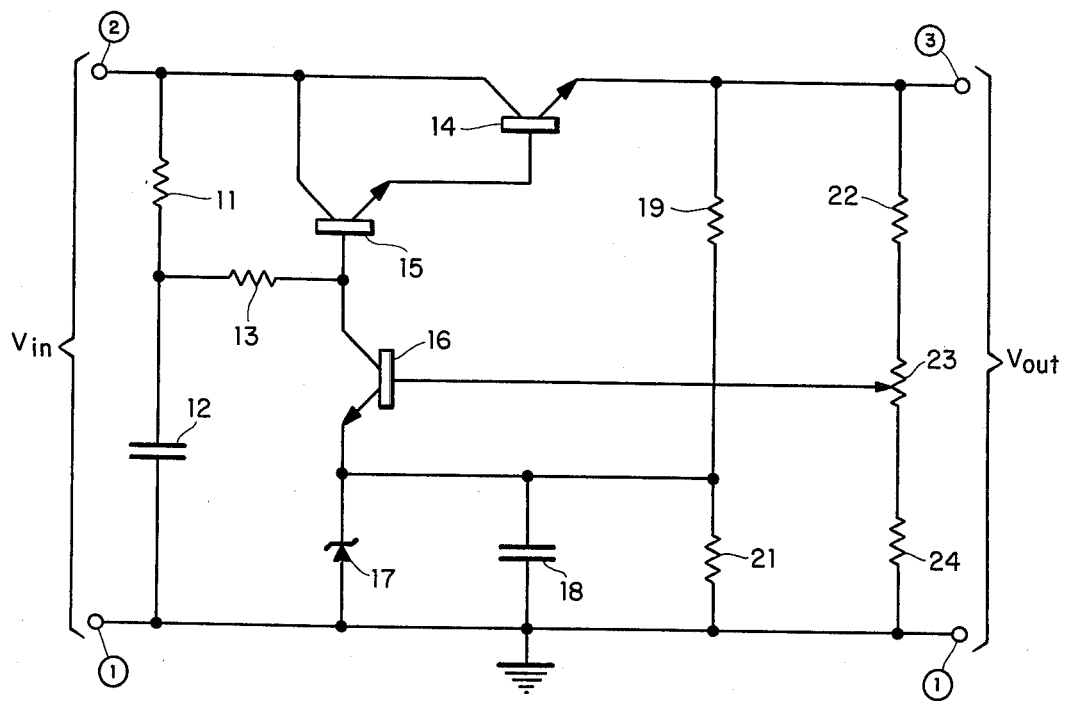

Referring to the FIGURE, an input (unregulated) voltage is applied between terminal 1 and terminal 2 of a voltage regulating circuit. In the preferred embodiment, terminal 1 is coupled to ground, however, other arrangements for grounding the circuit will be apparent to those skilled in the art.

Terminal 2 is coupled to a first terminal of resistor 11, to a collector of npn transistor 14 and to a collector of npn transistor 15. A second terminal of resistor 11 is coupled to a first terminal of resistor 13 and through capacitor 12 to terminal 1.

A second terminal of resistor 13 is coupled to a base of transistor 15 and to a collector of npn transistor 16. An emitter of transistor 16 is coupled to a cathode of Zener diode 17, through capacitor 18 to terminal 1, through resister 21 to terminal 1, and through resistor 19 to terminal 3. The anode of diode 17 is coupled to terminal 1.

A base of transistor 14 is coupled to an emitter of transistor 15, while an emitter of transistor 14 is coupled to terminal 3, and to a first terminal of resistor 22. A second terminal of resistor 22 is coupled to a first terminal of resistance potentiometer 23, while a variable terminal of the potentiometer 23 is coupled to a base of transistor 16 and a second terminal of potentiometer is coupled through resistor 24 to terminal 1. Terminals 3 and terminal 1 are the output voltage terminals of the power supply.

OPERATION OF THE PREFERRED EMBODIMENT

The operation of the voltage regulator circuit relies on the utilization of a variable resistance element between the input voltage of terminal 2 and the output voltage of terminal 3. The variable resistance, providing a variable voltage, is controlled by a comparison of a voltage related to the output voltage with a reference voltage.

In the normal operation in the preferred embodiment, the reference voltage is provided by the presence of Zener diode 17 in the emitter circuit of Transistor 16. This stable reference voltage is compared with the voltage supplied to the base of transistor 16 through the resistance dividing network comprised of resistor 22, resistor 24 and potentiometer 23. The collector current is supplied to transistor 16 through resistor 11 and resistor 13. Capacitor 12 provides a filter for attenuating part of a ripple component in the input voltage.

The variable resistance is provided by transistor 14 and transistor 15, coupled in a Darlington circuit arrangement. The transistor pair is controlled by coupling the base of transistor 15 to the collector of transistor 16. Resistor 19 is used to provide current to diode 17 to insure an acceptable operating point of the diode.

Thus, in normal operation, changes in the output voltage between terminal 3 and terminal 1 are applied through a resistance dividing network to the base of transistor 16. Transistor 16 causes the voltage across transistor 14 to vary so as to minimize the change in the output voltage. This negative feedback arrangement, as will be clear to those skilled in the art, will provide both d.c. regulation and regulation of the ripple voltage.

However, situations, such as can be found in cable television, occur where an input voltage level may fall below a level below which the regulatory mechanism described above can function. This can occur when the current through the Zener diode is no longer sufficient to provide a stable operating voltage. Nonetheless, the lack of d.c. regulation can be less important than the failure to suppress the ripple component of the output voltage.

In the instant invention, therefore, resistor 21 and capacitor 18 are coupled in the emitter circuit of transistor 16, in parallel with diode 17. Thus, when the diode 17 is no longer in a region of stable operation, resistor 21 becomes a bias resistor for the emitter of transistor 16. The emitter bias voltage resulting from this resistor is compared with the voltage applied to the base of transistor 16 through the resistor dividing network and the feedback operation, at least for transient voltages, can continue to operate. Capacitor 18 supplies a filter preventing the voltage of the emitter of transistor 16 from following fluctuations in the output voltage too closely. Thus, the addition of resistor 21 and capacitor 18 provides a suppression of the ripple voltage component even though the d.c. regulation which depended on a stable operating voltage provided by the Zener diode, is no longer operative.

As will be clear to one skilled in the art, resistor 21 is selected on the basis that if all the current desired to flow through resistor 19 flows through resistor 21, the potential across resistor 21 is below the Zener voltage level of diode 17.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A circuit for providing a regulated output voltage from an unregulated input voltage comprising:
   controllable resistance means coupled between an input voltage terminal and an output voltage terminal;
   means for supplying a stable voltage level;
   amplifier means for controlling said resistance means, said amplifier means coupled to means for supplying the stable voltage level, a value of resistance of said resistance means between said input terminal and said output terminal determined by said means for supplying a stable voltage and said output voltage;
   means for suppressing transients coupled to said amplifier means, said transient suppression means suppressing voltage transients upon failure of a voltage means to provide a stable voltage level, and wherein said transient suppression means includes a resistor and a capacitor coupled in parallel to said Zener diode.

2. The circuit of claim 1 wherein said controllable resistance means includes a transistor pair coupled in a Darlington arrangment.

3. A circuit for providing a regulated output voltage from an unregulated d.c. input voltage comprising:
   voltage means for providing a stable reference voltage;
   network means for providing a signal voltage related to said output voltage;
   means for comparison of said reference voltage and said signal voltage, said comparison means providing a difference signal;
   feedback means coupled to said comparison means, said feedback means varying said output voltage as a function of said difference signal;
   circuit means for providing a reference voltage which is related to the output voltage and coupled to said comparison means to provide a reference voltage when said voltage means is inoperative; and
   said circuit means includes only passive elements.

4. The circuit of claim 3 wherein said circuit means includes a resistor and a capacitor coupled in parallel.

5. The circuit of claim 4 wherein said means for comparison includes a npn transistor, wherein said voltage means includes a Zener diode coupled to an emitter of said transistor, and wherein said circuit means is coupled in parallel with said Zener diode.

6. A circuit for providing a regulated ouptut voltage from an unregulated d.c. input voltage comprising:
   controllable resistance means, said resistance means coupled between an input voltage terminal and an output voltage terminal;
   means for controlling said resistance means;
   means for providing a voltage level related to said output voltage, said voltage level means coupled to said control means; and
   means for providing a reference voltage signal, said reference means coupled to said control means, output wherein said control means output is dependent on a difference between said voltage level and said voltage signal, reference wherein said reference voltage is provided for d.c. ripple output voltage components above a predetermined input voltage level, wherein a second voltage level, coupled to said control means, is provided for controlling said ripple frequency output voltage components below said predetermined input voltage level, and said reference means includes a Zener diode, a resistor and a capacitor, all coupled in parallel.

7. The circuit of claim 6 wherein said control means includes a transistor, an emitter of said transistor being coupled to said reference voltage means, and wherein a collector of said transistor is coupled through at least two resistive elements to said input voltage terminal.

8. A circuit for providing a regulated output voltage from an unregulated d.c. input voltage comprising:

at least one transistor coupled between an input voltage terminal and an output voltage terminal;

a control transistor for controlling a voltage across said at least one transistor;

a first network coupled to an emitter of said control transistor, said network including a Zener diode, a resistor and a capacitor all connected in parallel;

a second network coupled between a base of said transistor and said output voltage terminal, wherein said voltage across said one transistor is dependent on the control transistor base voltage and the control transistor emitter voltage.

9. The circuit of claim 8 wherein a third network couples a collector of said control transistor to said input voltage terminal.